United States Patent [19]

Buckler et al.

[11] 4,111,349

[45] Sep. 5, 1978

[54] CUPS, PLATES, TRAYS OR CONTAINERS FORMED FROM LAMINATES CONTAINING FILLED POLYSTYRENE

[75] Inventors: Ernest Jack Buckler; Michael Hugh Richmond, both of Sarnia, Canada

[73] Assignee: Polysar Limited, Sarnia, Canada

[21] Appl. No.: 723,283

[22] Filed: Sep. 14, 1976

[30] Foreign Application Priority Data

Oct. 22, 1975 [CA] Canada ................................. 238303

[51] Int. Cl.² .......................... B65D 1/00; B65D 5/20
[52] U.S. Cl. ................................... 229/3.5 R; 428/308;
428/310; 428/304; 428/158; 428/515; 428/516;
428/517; 428/519; 260/42.56; 260/42.57;
260/876 B; 521/84; 521/91; 521/146; 229/48 T
[58] Field of Search ............... 428/158, 308, 515, 516,
428/517, 519, 304, 310, 35; 229/3.5 R, 43, 48 T;
260/2.5 AK, 42.56, 42.57, 876 B

[56] References Cited

U.S. PATENT DOCUMENTS

| 3,157,564 | 11/1964 | Tucker et al. | 428/517 X |
| 3,284,542 | 11/1966 | Carrock et al. | 260/4 R |
| 3,413,249 | 11/1968 | Luftglass | 260/42.57 X |
| 3,598,642 | 8/1971 | Huang et al. | 428/517 X |
| 3,660,849 | 5/1972 | Jonnes et al. | 428/308 X |
| 3,696,987 | 10/1972 | Schuff et al. | 428/517 X |
| 3,790,435 | 2/1974 | Tanba et al. | 428/308 X |
| 3,846,360 | 11/1974 | Needham | 260/42.56 X |
| 3,976,608 | 8/1976 | Buckler et al. | 260/42.56 X |
| 4,008,347 | 2/1977 | Amberg et al. | 428/35 |

Primary Examiner—P. C. Ives
Attorney, Agent, or Firm—Stevens, Davis, Miller & Mosher

[57] ABSTRACT

Thermoplastic polymeric laminates are prepared which have one layer of filled styrene polymer composition, and at least one layer of a dissimilar polymer selected from polyolefins such as polyethylene, polypropylene and polybutene, and nitrile group containing barrier polymers. The filled styrene polymer composition contains from 5 to 50 parts by weight filler, and is the product of mixing a styrene polymer masterbatch of impact polystyrene, filler, rubber and oil with polystyrene. The laminates can be used for thermoforming thin walled articles such as cups, plates, trays and containers.

9 Claims, 6 Drawing Figures

U.S. Patent     Sept. 5, 1978     4,111,349
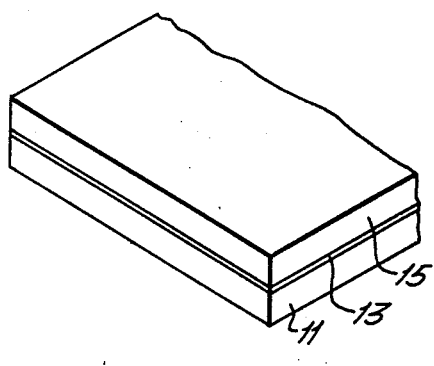
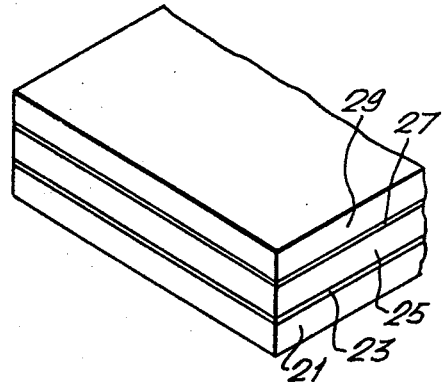
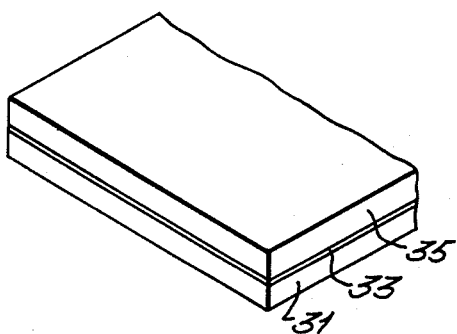
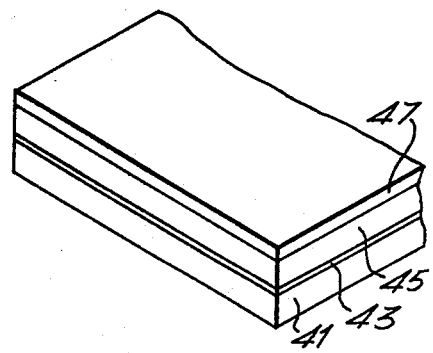
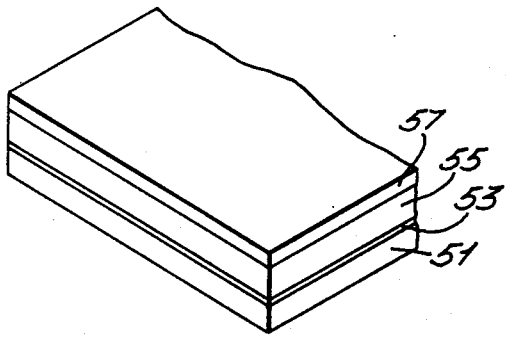
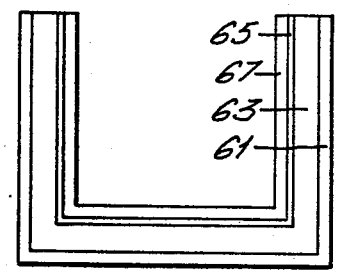

CUPS, PLATES, TRAYS OR CONTAINERS FORMED FROM LAMINATES CONTAINING FILLED POLYSTYRENE

This invention relates to layer thermoplastic products, and processes for their preparation. More particularly, it refers to laminates having layers of at least two diverse thermoplastic materials, at least one of which is a polystyrene composition.

It is known to prepare thermoplastic laminates of a plurality of layers of dissimilar thermoplastic materials in an attempt to obtain products having an advantageous combination of the desirable properties of the individual materials. For example, one component may contribute strength, possibly at elevated temperatures, and stiffness whereas a second component may provide impact strength, the laminate then having a desirable balance of properites. Such an example is low density polyethylene-crystal polystyrene-low density polyethylene.

The present invention provides a laminate of diverse thermoplastic materials exhibiting an advantageous combination of properites. In addition, the laminate is simple to prepare, easy to form in conventional thermoforming machine, and is based upon inexpensive thermoplastic materials. The laminate of the invention uses, as one of its layers, a styrene polymer containing relatively large amounts of filler.

Thus according to the present invention, there is provided a thermoplastic polymeric laminate comprising at least one layer of a filled styrene polymer composition containing from about 5 to 50 parts by weight of filler, said filled styrene polymer composition being the product of mixing a styrene polymer masterbatch comprising impact polystyrene, filler, rubber and mineral oil, with polystyrene, in combination with at least one layer of a dissimilar polymer selected from a polyolefin and a nitrile group containing barrier polymer.

Laminates according to the present invention containing a filled styrene polymer layer as defined, have been found to have an advantageous combination of physical properties. The cost of materials for the laminate is reduced by the inclusion of low cost fillers in the styrene polymer layer. Recent petro-chemical shortages have led to substantial increases in the cost of styrene monomer, so that it is highly desirable to be able to produce and use as laminate layers materials having the properties of polystyrene but having their styrene content reduced by partial replacement with cheaper materials. By using as the filled styrene polymer layer a masterbatch containing impact polystyrene filler, oil and rubber, cut back by addition of more polystyrene, a filled styrene polymer layer is achieved containing relatively large amounts of filler evenly dispersed in the composition forming the filled layer.

Except for some specialty applications such as fibre reinforcement, it has not previously been found practical to prepare filled polystyrene compositions. In contrast with synthetic rubbers, the presence of filler has not been required to confer good strength properties on polystyrene. In fact, mineral fillers incorporated directly into polystyrene are known generally to cause reductions in the strength characteristics of the mixture. Incorporation of fillers directly into a polymeric material has the disadvantage that it is necessary to use high shear mixing equipment to prepare the filled compositions, with consequent increase in the energy requirements for the mixing process. Further, since the specific gravity of mineral fillers is generally higher than that of the polystyrene, the direct use of such mineral fillers as partial replacement of polystyrene in a polystyrene composition would yield a more dense material having no volume advantage.

According to the present invention, it has been discovered that thermoplastic polymer laminates having an advantageous combination of properties can be prepared using at least one layer of filled styrene polymer composition, the filled styrene composition comprising polystyrene, filler, rubber and mineral oil, and prepared from a masterbatch as previously defined, and at least one layer of a dissimilar polymer selected from a polyolefin and a nitrile group containing barrier polymer. Such filled styrene polymer compositions can be made readily and economically, using standard processing equipment.

The preferred polyolefins for use in the laminates of the present invention are polyethylene, polypropylene, and polybutene, with the most preferred polyolefin being polypropylene. The laminates of the invention may have three or more layers, a central layer being of the filled polystyrene composition, a first outer layer being of polyolefin or a nitrile group containing barrier polymer and a second outer layer of polymeric material which may be a polyolefin or polystyrene. Polypropylene has particularly desirable thermal resistant, solvent resistant and barrier characteristics. Thus, one preferred laminate of the present invention comprises a first outer layer of polypropylene, an inner layer of filled styrene polymer composition as defined herein, and a second outer layer of crystal polystyrene.

The filled styrene polymer composition used as a layer in the laminates of the invention comprises a filled polystyrene masterbatch which is cut back by mixing with at least one other polystyrene, the filled polystyrene masterbatch containing 100 parts by weight impact polystyrene, at least one filler in an amount of from about 10 to 200 parts by weight, at least one rubber in the amount of from 1 to about 40 parts by weight, and mineral oil in an amount of from 1 to about 40 parts by weight. This masterbatch is then mixed with at least one other polystyrene which may be an impact polystyrene or a crystal polystyrene or both in amounts such that the final mixture contains at least 5 parts by weight but not more than 50 parts by weight of filler per 100 parts by weight of the mixture.

Examples of suitable fillers for use in the filled sytrene polymer composition layer of the present invention include the inorganic mineral fillers such as calcium or magnesium carbonates, calcium sulphate, aluminum oxide and hydrates thereof, clays, aluminum silicate, silica, talc, asbestos fibres, vermiculite, wollastonite and glass fibres. Suitable fillers also include naturally derived products such as particulate starch, wood sawdust and various wood flours, peanut shell husks and other such materials normally considered as waste products. Also included as suitable fillers are the small sized essentially spherical glass beads having an average diameter range of about 10 to about 60 microns. Mixtures of these fillers may also be used, for example, mixtures of glass beads and an inorganic mineral filler are suitable. The fillers may be used as such or may be treated as with coupling agents.

Example of rubbers useful in the filled styrene polymer compositions include styrene-butadiene rubbers containing up to 45 weight per cent of bound styrene, a styrene-butadiene rubber being a blended product containing an average of from 40 to 60 weight per cent of bound styrene and being a blend of (a) styrene-butadiene rubber containing from 15 to 35 weight per cent of bound styrene and (b) styrene-butadiene polymer containing from 75 to 95 weight per cent of bound styrene, polybutadiene rubber, high cis-1,4 polyisoprene, natural rubber, thermoplastic rubbery block copolymers comprising vinyl or vinylidene-substituted aromatic hydrocarbon polymer blocks and conjugated diolefin polymer blocks, ethylene-propylenediene rubbers or mixtures thereof. Preferred rubbers include the styrene-butadiene rubbers, the polybutadienes and the thermoplastic rubbery block copolymers.

Examples of suitable oils include the mixed napthenic-aromatic oils, and, when colour is not a problem, the highly aromatic oils.

In preparing the filled styrene polymer compositions used in the laminates of the present invention, a materbatch is formed of an impact polystyrene, the filler, oil and rubber, and the masterbatch is then mixed with polystyrene, which may be crystal polystyrene, impact polystyrene or a mixture thereof, to form the blend ready for lamination. The impact polystyrene used to prepare the masterbatch contains from 1 to 15 weight per cent of a rubber selected from polybutadiene, polyisoprene, thermoplastic rubbery block vinyl or vinylidene aromatic hydrocarbon-conjugated diolefin polymer and ethylene-propylene-diene rubber as hereinbefore described. The impact polystyrene must contain some grafted rubber and does not include mechanical blends of crystal polystyrene with rubber. The amount of rubber blended with the impact polystyrene to form the masterbatch is from 1 part by weight to about 40 parts by weight based on 100 parts by weight of the impact polystyrene. Preferred amounts of rubber are from about 5 parts to about 25 parts by weight of the impact polystyrene. Quantities of filler added to the impact polystyrene to form the masterbatch are from 10 to 200 parts by weight, preferably from 25 to 100 parts by weight, per 100 parts by weight of impact polystyrene. The amount of oil added to the impact polystyrene to form the masterbatch is from 1 to 40 parts, preferably from 5 to 25 parts, by weight per 100 parts by weight of impact polystyrene.

The masterbatch of impact polystyrene, rubber, filler and oil according to the invention may be prepared by any suitable method wherein the impact polystyrene can be melted or fluxed and the other components can be well mixed with and dispersed in the molten polystyrene. For example, the impact polystyrene can be fed to a hot two roll mill, maintained at a temperature of at least 110° C to about 160° C, preferably from 120° C to about 150° C, fluxed on the mill rolls and the rubber, filler and oil added separately or as a combination of any two or three components. The mixture is maintained on the hot mill rolls until a good dispersion is obtained. The masterbatch can also be prepared in an internal mixer such as a Banbury mixer or a Farrel continuous mixer, using a temperature of about 110° to about 200° C, preferably from about 130° to 175° C. The masterbatch can also be prepared in a mixing extruder provided that adequate mixing is achieved with the extruder.

The styrene polymer masterbatch is cut back by mixing with a polystyrene selected from either or both of crystal polystyrene and impact polystyrene. Various grades of crystal or general purpose polystyrene can be used. An impact polystyrene, when used, will usually contain a relatively low proportion of rubber, e.g. less than about 10 weight per cent. The exact nature of the polystyrene which is mixed with the masterbatch is dependent more on cost and availability of the polystyrene. The proportions of masterbatch and polystyrene which are used to form the styrene polymer composition for making the laminates according to the present invention depend on the composition of the masterbatch and the desired properties of the blend. Generally, it is preferred that the styrene polymer composition should contain at least about 5 but not more than 50 parts by weight of the filler per 100 parts by weight of the composition. Other additives can also be incorporated, such as antistatic agents, colorants, etc. Blowing agents may be incorporated if it is desired to produce a foamed product.

The process for mixing the masterbatch with the polystyrene to form the styrene polymer composition ready for laminating purposes is generally in accordance with known plastics mixing procedures. The masterbatch is preferably supplied to this mixing operation in pellet form. The mixing with the polystrene can then be achieved with equipment readily available in the thermoplastics industry. Pellet form masterbatch can be dry mixed with pellet form polystyrene in a tumbler mixer, and the mixed pellets then fed to the shaping equipment, optionally via a heated extruder.

According to the present invention, laminates are made using at least one layer of filled styrene polymer composition previously described and at least one layer of a dissimilar polymer selected from a polyolefin and a nitrile group containing barrier polymer.

Suitable polyolefins include polyethylene, polypropylene and polybutene-1, with polypropylene being preferred. The nitrile group containing barrier polymer suitably contains from about 60 to about 85 weight percent of acrylonitrile or methacrylonitrile bound in the polymer together with suitable comonomers such as acrylates or methacrylates, styrene, butadiene, isobutylene or mixtures of two or more such monomers. The barrier polymer may be a copolymer or a graft copolymer. Barrier polymers are well known for their very low levels of permeability to gases such as oxygen and carbon dioxide and to water vapor; the polymers are being used in a variety of packaging applications where low permeability is necessary. Suitable barrier polymers include those polymers which contain acrylonitrile, butadinene and styrene, or methacrylonitrile, butadiene and styrene, or acrylonitrile, isobutylene and styrene, the acrylonitrile (methacrylonitrile) contents of which are preferably from about 65 to about 80 weight per cent.

Preferred laminates according to the present invention comprise (1) an outer layer of crystal polystyrene (which is readily printable), a layer of filled styrene polymer composition, and a second outer layer of polypropylene (which, because of its thermal characteristics, makes it suitable for use in hot filling processes), and (2) an outer layer of crystal polystyrene, a layer of filled styrene polymer composition, and a second outer layer of nitrile group containing barrier polymer (which, because of its barrier properties, acts to protect food stuffs from aerial oxidation). The layer of filled styrene polymer composition may be solid or may be foamed.

In the laminates of the invention, it is necessary to include a thin layer of adhesive layer between the layers of the laminate. A wide variety of polymeric adhesive materials can be used for this purpose. Examples include ethylene-vinyl acetate copolymers which contain from about 15 to about 40 weight per cent of vinyl acetate; ethylene-ethyl acrylate copolymers containing from about 20 to about 30 weight per cent ethyl acrylate; ethylene-isobutyl acrylate copolymers containing from about 20 to about 30 weight per cent isobutyl acrylate; chlorinated polyethylene; block copolymers of styrene and butadiene; epoxy resins; and mixtures of two or more of such polymeric adhesives.

Laminates of the present invention may be made by processes known in the art. They may be made by a process of coextrusion, whereby the polymeric compositions to form the thermoplastic layers of the laminate and the adhesive layers are fed separately to an extruder, arranged in the desired order of layers prior to extrusion, as adjacent streams of different composition, and extruded together through a common die in laminate arrangement. Such processes of coextrusion are known in the art. The laminates of the present invention may also be prepared by laying in the desired order, the various layers one on top of the other with an adhesive layer between each thermoplastic layer and adhering or uniting them as by pressing, calendaring, heat pressing etc.

Of particular interest and significance in the present invention, there are provided laminates comprising at least one layer of polyolefin and at least one layer of a foamed filled styrene polymer composition. These are prepared by incorporating a suitable amount of blowing agent into the filled styrene polymer composition. The blowing agent may be of the chemical type such as axodicarbonamide, benzensulfonylhydrazide and azobisformamide, or maybe volatile chemicals such as pentane or a Freon. The blowing agent may be incorporated as a powder directly into the masterbatch or may be incorporated as a pre-prepared masterbatch, blended into the masterbatch, or blended into the masterbatch together with the polystyrene added to cut back the masterbatch. Foaming will occur on extrusion and forming of the laminate. Such foamed blends can be readily laminated with one or more layers of polyolefin such as polypropylene, e.g. by coextrusion, to form sheets having an advantageous combination of strength, heat softening temperature and printability characteristics, together with very light weight. Such laminates can be formed and molded into plastics products such as containers, having a desirable combination of properties.

The laminates of the present invention, when no foam layers are present, preferably have an overall thickness from about 0.05 mm. to about 1.5 mm. Of this overall thickness, it is preferred that the filled styrene polymer composition layer comprise from about 40 to 80 per cent, most preferably from about 50 to 70 per cent, thereof. When a foamed filled styrene polymer composition layer is included, it is preferred that the laminate have an overall thickness of from about 0.1 to at least about 2.5 mm., with the foamed layer comprising from about 60 to about 95 per cent of the overall thickness.

The laminates of the present invention may be used for making thin walled thermoplastic articles such as cups, trays, plates, containers and the like. These can be made by thermoforming, in the known way. The laminates of the present invention are readily formed and processed by known methods, using known apparatus and techniques. They display a satisfactory combination of strength, rigidity and toughness, together with good ageing characteristics and stability. In addition, attractive surface appearance of articles made from the laminates is achieved by suitable selection of the surface layer, which may also be printed and decorated. The laminates have the advantage of economy, since they are prepared from low cost, readily available materials, and using standard thermoplastics processing equipment.

The accompanying drawings illustrate preferred forms of the present invention, in which:

FIG. 1 is a part sectional view of a first laminate according to the invention;

FIG. 2 is a part sectional view of a second laminate according to the invention;

FIG. 3 is a part sectional view of a third laminate according to the invention;

FIG. 4 is a part sectional view of a fourth laminate according to the invention;

FIG. 5 is a part sectional view of a fifth laminate according to the invention; and FIG. 6 is a cross-sectional view of a container formed from a laminate according to the invention.

With reference to FIG. 1, there is illustrated a laminate having one layer 11 of polypropylene and one layer 15 of filled styrene polymer composition. Joining these two layers is a thin layer 13 of adhesive, an ethylene-vinyl acetate copolymer based composition.

In FIG. 2 is illustrated a laminate having three thermoplastic layers. One outer layer 21 of polypropylene and a second outer layer 29 of polypropylene surrounding a central layer 25 of filled styrene polymer composition. Between each layer is a layer 23 and 27 of adhesive.

In FIG. 3 there is shown a laminate of a layer 35 of a filled styrene polymer composition adhered by an adhesive layer 33 to a layer 31 of a nitrile group containing barrier polymer, namely a polymer of acrylonitrile, styrene and isobutylene.

FIG. 4 illustrates a laminate of a layer 41 of polypropylene contacted through a layer 43 of adhesive to a layer 45 of filled styrene polymer composition to which is directly attached a layer 47 of crystal polystyrene.

Referring to FIG. 5 there is shown a laminate of a layer 51 of a nitrile group containing barrier polymer adhered by an adhesive layer 53 to a layer 55 of filled styrene polymer composition to which is directly adhered a layer 57 of crystal polystyrene.

FIG. 6 illustrates a container formed from the laminate shown in FIG. 4, wherein the polypropylene layer 67 forms the inside of the container and is attached through an adhesive layer 65 to a layer 63 of filled styrene polymer composition. The outside layer 61 is of crystal polystyrene which is attached directly to layer 63. Layer 61 can readily be printed and decorated to provide the usual and aesthetic effects required to describe the product contained within the container. Due to the polypropylene layer 67 the container may be filled, without thermal distortion, with hot materials, such as foodstuffs, at temperatures up to about 250° F.

In all of the laminates described in FIGS. 1 – 6, the filled styrene polymer composition forms the major thickness of the laminate and may be present in either the solid or the foamed state.

What is claimed is:

1. A thermoplastic polymeric laminate comprising at least one layer of filled styrene polymer composition containing from about 5 to about 50 parts by weight of filler and at least one layer of a dissimilar polymer selected from a polyolefin and a nitrile group containing polymer, said filled styrene polymer composition being the product of mixing a styrene polymer masterbatch with polystyrene, said styrene polymer masterbatch comprising 100 parts by weight of impact polystyrene, from 1 to 40 parts by weight of rubber, from 10 to 200 parts by weight of filler and from 1 to 40 parts by weight of mineral oil.

2. The laminate of claim 1 wherein the filler in the masterbatch is selected from particulate starch, wood sawdust, wood flour, peanut shell husks, glass beads, inorganic mineral fillers selected from calcium carbonate, magnesium carbonate, calcium sulphate, aluminum oxide and hydrates thereof, clay, aluminum silicate, silica, talc, mica, wollastonite, vermiculite, asbestos fibres and glass fibres, and mixtures thereof.

3. The laminate of claim 1 wherein the rubber in the masterbatch is selected from styrene-butadiene rubber, polybutadiene rubber, high cis-1,4-polyisoprene, natural rubber, thermoplastic rubber block copolymers comprising vinyl- or vinylidene-substituted aromatic hydrocarbon polymer blocks and conjugated diolefin polymer blocks, ethylene-propylene-diene rubber and mixtures thereof and wherein the mineral oil is a mixed naphthenic-aromatic or aromatic oil.

4. The laminate of claim 1 wherein the dissimilar polymer is selected from polyethylene, polypropylene, polybutene-1, and nitrile group containing barrier polymers containing from about 60 to about 85 weight per cent of acrylonitrile or methacrylonitrile bound in a copolymer with an acrylate, a methacrylate, styrene, butadiene, isobutylene or mixtures of two or more such monomers.

5. The laminate of claim 4 comprising a first outer layer of polypropylene, a central layer of filled styrene polymer composition and a second outer layer of polypropylene.

6. The laminate of claim 4 comprising a first outer layer of polypropylene, a central layer of filled styrene polymer composition and a second outer layer of polystyrene.

7. The laminate of claim 4 comprising a first outer layer of nitrile group containing barrier polymer, a central layer of filled styrene polymer composition and a second outer layer of polystyrene.

8. The laminate of claim 4 wherein the layer of filled styrene polymer composition is foamed.

9. Cups, plates, trays or containers formed from the laminates of claim 4.

* * * * *